(12) United States Patent
Martin et al.

(10) Patent No.: US 12,155,639 B2
(45) Date of Patent: Nov. 26, 2024

(54) METHOD AND DEVICE FOR PUBLISHING CROSS-NETWORK USER BEHAVIORAL DATA

(71) Applicant: GULA CONSULTING LIMITED LIABILITY COMPANY, Dover, DE (US)

(72) Inventors: Anthony Martin, Los Altos, CA (US); David L. Goulden, Redwood City, CA (US); Dominic V. Bennett, Los Altos, CA (US); Roger Petersen, Palo Alto, CA (US); Remigiusz K. Paczkowski, Belmont, CA (US)

(73) Assignee: GULA CONSULTING LIMITED LIABILITY COMPANY, Dover, DE (US)

( * ) Notice: Subject to any disclaimer, the term of this patent is extended or adjusted under 35 U.S.C. 154(b) by 0 days.

(21) Appl. No.: 18/149,631

(22) Filed: Jan. 3, 2023

(65) Prior Publication Data
US 2023/0164127 A1 May 25, 2023

Related U.S. Application Data

(63) Continuation of application No. 16/041,232, filed on Jul. 20, 2018, now Pat. No. 11,546,313, which is a
(Continued)

(51) Int. Cl.
*G06F 16/335* (2019.01)
*G06F 16/34* (2019.01)
(Continued)

(52) U.S. Cl.
CPC ............ *H04L 63/08* (2013.01); *G06F 16/337* (2019.01); *G06F 16/345* (2019.01);
(Continued)

(58) Field of Classification Search
CPC ....... H04L 63/08; H04L 67/01; G06F 16/337; G06F 16/9535; G06F 16/345;
(Continued)

(56) References Cited

U.S. PATENT DOCUMENTS 5,774,670 A 6/1998 Montulli et al.
5,848,396 A 12/1998 Gerace
(Continued)

FOREIGN PATENT DOCUMENTS

WO 03010685 A1 2/2003

OTHER PUBLICATIONS

"Surf in Peace 2.01"webpage online, WebAttack.com, retrieved on Oct. 4, 2001, URL:http/download.cnet.com/URL: http//www.webattach.com/get/sip.shtml>, 2 pages.
(Continued)

*Primary Examiner* — Joshua Bullock
(74) *Attorney, Agent, or Firm* — Shih IP Law Group, PLLC

(57) ABSTRACT

The present invention relates to summarizing cross-network user behavioral data. The summarizing cross-network user behavioral data may particularly include publishing the data to one or more data structures that become accessible to a server hosting an authorized domain when a user accesses the authorized domain.

17 Claims, 7 Drawing Sheets

Related U.S. Application Data continuation of application No. 15/278,533, filed on Sep. 28, 2016, now Pat. No. 10,033,716, which is a continuation of application No. 12/715,311, filed on Mar. 1, 2010, now Pat. No. 9,495,446, which is a continuation of application No. 11/226,066, filed on Sep. 14, 2005, now Pat. No. 7,693,863.

(60) Provisional application No. 60/637,684, filed on Dec. 20, 2004.

(51) Int. Cl.
  *G06F 16/9535* (2019.01)
  *G06Q 10/06* (2023.01)
  *G06Q 30/0241* (2023.01)
  *G06Q 30/0251* (2023.01)
  *H04L 9/40* (2022.01)
  *H04L 67/01* (2022.01)

(52) U.S. Cl.
  CPC ......... *G06F 16/9535* (2019.01); *G06Q 10/06* (2013.01); *G06Q 30/0255* (2013.01); *G06Q 30/0256* (2013.01); *G06Q 30/0277* (2013.01); *H04L 67/01* (2022.05)

(58) Field of Classification Search
  CPC ............... G06Q 10/06; G06Q 30/0255; G06Q 30/0256; G06Q 30/0277
  USPC ......................................................... 705/14
  See application file for complete search history.

(56) References Cited

U.S. PATENT DOCUMENTS

| | | | |
|---|---|---|---|
| 5,991,735 | A | 11/1999 | Gerace |
| 6,223,215 | B1 | 4/2001 | Hunt |
| 6,466,918 | B1 | 10/2002 | Spiegel |
| 6,466,970 | B1 | 10/2002 | Lee |
| 6,489,968 | B1 | 12/2002 | Ortega |
| 6,581,072 | B1 | 6/2003 | Mathur |
| 6,601,100 | B2 | 7/2003 | Lee et al. |
| 6,701,906 | B2 | 3/2004 | Subramonian et al. |
| 6,801,906 | B1 | 10/2004 | Bates et al. |
| 6,871,196 | B1 | 3/2005 | Chan et al. |
| 6,968,507 | B2 | 11/2005 | Pennell et al. |
| 7,162,739 | B2 | 1/2007 | Cowden et al. |
| 7,480,862 | B2 | 1/2009 | Cowden et al. |
| 8,200,617 | B2 * | 6/2012 | Spivack ............... G06F 16/955 707/602 |
| 2001/0054020 | A1 | 12/2001 | Barth et al. |
| 2002/0007309 | A1 | 1/2002 | Reynar |
| 2002/0013729 | A1 * | 1/2002 | Kida .................. G06Q 30/0269 705/14.54 |
| 2002/0112035 | A1 | 8/2002 | Carey |
| 2002/0156881 | A1 | 10/2002 | Lemon |
| 2002/0161673 | A1 | 10/2002 | Lee et al. |
| 2002/0198939 | A1 | 12/2002 | Lee et al. |
| 2003/0009497 | A1 | 1/2003 | Yu |
| 2003/0018778 | A1 | 1/2003 | Martin et al. |
| 2003/0023712 | A1 | 1/2003 | Zhao et al. |
| 2003/0050863 | A1 | 3/2003 | Radwin et al. |
| 2003/0101242 | A1 | 5/2003 | Cowden et al. |
| 2003/0130910 | A1 | 7/2003 | Pickover |
| 2004/0122943 | A1 | 6/2004 | Error |
| 2004/0247748 | A1 | 12/2004 | Bronkema |
| 2004/0254844 | A1 | 12/2004 | Torres |
| 2005/0021397 | A1 * | 1/2005 | Cui ..................... G06Q 30/0251 705/14.42 |
| 2005/0033771 | A1 * | 2/2005 | Schmitter ............. G06Q 30/02 |
| 2005/0182773 | A1 | 8/2005 | Feinsmith |
| 2005/0188423 | A1 | 8/2005 | Motsinger et al. |
| 2005/0273463 | A1 | 12/2005 | Zohar et al. |

OTHER PUBLICATIONS

International Search Report and Written Opinion from International Application No. PCT/US05/45722 mailed Jan. 19, 2007, 12 pages.
International Search Report and Written Opinion from International Application No. PCT/US05/01022 mailed Apr. 24, 2006, 8 pages.
International Preliminary Report on Patentability from International Application No. PCT/US2005/035352 mailed Sep. 11, 2007.
International Preliminary Report on Patentability from International Application No. PCT/US06/025102 mailed Jul. 26, 2007, 4 pages.
Office Action from UK Application No. GB0724938.6 dated Feb. 16, 2011.
Lindsay Smith, "A Tutorial on Principal Components Analysis", Feb. 26, 2002.
Visual Search ToolBar—Graphically Enhance Search Results, 2004, Viewpoint Corporation; webpage online, retrieved Oct. 7, 2004., URL:http://www.viewpoint.com/pub/toolbar/download.html.
European Search Report for Application No. EP 06 01 3103, 2 pages, Feb. 2, 2010.
CodeBrain.com Java at its Best: Javascript Index Windows and Frames, http://www.codelifter.com/main/javascript/index windowframes.html, 2 pages, accessed on Dec. 19, 2005.
Hongyu Liu et al., "Focused Crawling by Learning HMM from User's Topic-Specific Browsing" Proceedings of the IEEE/WIC/ACM International Conference on Web intelligence (WI '04), 4 pages, Sep. 20, 2004.
International Preliminary Report on Patentability and Written Opinion in PCT Application No. PCT/US2005/035352, May 2, 2008.
Japanese Patent Office, Office Action mailed Jul. 26, 2010 from Japanese Serial No. JP2008-519504, filed Jun. 5, 2008.
International Search Report in EP Application No. 05802579.2-1527, dated May 2, 2008, 4 pages.
International Preliminary Report on Patentability and Written Opinion in PCT Application No. PCT/US2005/001022, dated Apr. 26, 2006, 6 pages.
"Ad Close", Webpage [online]. C/net Downloads.com [retrieved on Oct. 4, 2001], <URL http://download.cnet.com/downloads/0-10059-100-915154.thml> 2 pages.
"Ad Muncher", Webpage [online]. C/net Downloads.com [retrieved on Oct. 4, 2001]. Retrieved from the Internet<URL:http//downloads/0-33567-18-100-2750044.html>, 2 pages.
"AdDelete", Webpage [online]. C/net Download.com [retrieved on Oct. 4, 2001]. Retrieved from the Internet <URL:http//download.cnet.com/downloads/0-10059100-7003126.html>, 2 pages.
"Adextinguisher-Introduction and News Section", Webpage [online][retrieved on Oct. 4, 2001]. Retrieved from the Internet URL:http//adext.magenet.net.html., 2 pages.
"AdPurger", Webpage [online]. C/net Downloads.com [retrieved on Oct. 4, 2001]. Retrieved from the Internet <URL:http//download.cnet.com/downloads/0-10068-100-5067717.html>, 2 pages.
"AdsOff", Webpage [online]. C/net Downloads.com [retrieved on Oct. 3, 2001]. Retrieved from the Internet<URL:http//download.cnet.com/downloads/0-10059-100-9 12651 html>., 2 pages.
"AdSubstract SE", webpage [online], C/net Downloads.com [retrieved on Oct. 4, 2001], Retrieved from the Internet<URL:http//download.cnet.com/downloads/0-3356727-100-5963713.html.>, 2 pages.
"Advertising Killer", webpage online, C/net Downloads.com, retrieved on Oct. 3, 2001, retrieved from the Internet<URL:http//dowload.cnet.com/dowloads/0-10059-100-1539520.html>, 2 pages.
"AllGone", webpage online, C/net Downloads.com, retrieved on Oct. 4, 2001, Retrieved from the Internet<URL:http//download.cnet.com/downloads/0-10068-100-2915974.html>, 2 pages.
"AnalogX Pow", webpage online., C/net Downloads.com, retrieved on Oct. 4, 2001, Retrieved from the Internet<URL:http/download.cnet com/downloads-0-3356748-10-915372.html., 2 pages.
"Banner Zapper", webpage online, C/net Downloads.com, retrieved on Oct. 4, 2001, Retrieved from the Internet <URL:http//download.cnet.com/downloads/0-3356727-100-6384611.html>., 2 pages.
BanPopup, webpage online, C/net Downloads.com, retrieved on Oct. 4, 2001, retrieved from the Internet<URL:http//downloads.cnet.com/downloads/0-10059-100-6901908.html>, 2 pages.

(56) References Cited

OTHER PUBLICATIONS

"Black List", webpage online, C/net Downloads.com, retrieved on Oct. 4, 2001, retrieved from the Internet<URL:http//downloads.cnet.com/downloads/0-10059-100-902347html>, 2 pages.

"Close Pop 4.0", webpage online, Take Hike Software, retrieved on Oct. 4, 2001, URL:http//www.ryanware.com/close_popup.html>, 1 page.

"Claria-Company Information—Corporate Overview", retrieved on Mar. 3, 2005, , retrieved from the Internet<URL:http//claria.com/companyinfo.html>.

"Close Popup", webpage online, C/net Downloads.com, retrieved on Oct. 4, 2001, retrieved from the Internet<URL:http//downloads.cnet.com/downloads/0-10059-100-905799.html>., 2 pages.

"CobraSoft PopStop", webpage online, C/net Downloads.com, retrieved on Oct. 4, 2001, retrieved from the Internet<URL:http//downloads.cnet.com/downloads/0-10058-100-6926765.html>, 2 pages.

"Compare Prices and Read Reviews on AdsOff!", Epenions.com, webpage online, retrieved on Jan. 21, 2001, 3 pages.

"CrushPop 2000", webpage online, www.32bit.com, retrieved on Oct. 4, 2001, URL.http//32bit.com/software.com/software/listings/Internet/Special/180P/13794.html., 2 pages.

Definition of "Close button", Microsoft Press Computer Dictionary, 3rd ed., Redmond WA: Microsoft Press, 1997, 2 pages.

"Directive 202/58/EC of the European Parliament and of the Council of Jul. 12, 2002 Concerning the Processing of Personnal Data and the Protection of Privacy in the Electronic Communications Sector (Directive on Privacy and Electronic Communications)", Official Journal L 201, Jul. 31, 2002, pp. 0037-0047.

"DoubleClick", webpage online, retrieved on Jun. 11, 2003, retrieved from the Internet<URL:http//www.doubleclick.com>, 17 pages.

"Close button" Definition from online google search dated Mar. 2, 2007, 1 page.

"Target Gets Mod in Manhattan", by Laura Heller, Aug. 20, 2001, pp. 2 & 37.

"InterMute" webpage online, retrieved on Oct. 3, 2001, retrieved from the Internet<URL:http//downloads.cnet.com/downloads/0-10059-100-906599.html>, 2 pages.

"Gator offers one-click shopping at over 5,000 e-commerce sites today", Jun. 14, 1999; XP002145278; Date retrieved; Jun. 28, 2001., URL:http//www.gator.com/company/press/pr061499b.html., 1 page.

"Opening a Window", Kourbatov, A., Jul. 8, 2000., published by www.javascript.net, 2 pages.

Marcebra Net, webpage online, C/net Downloads.com, retrieved on Oct. 4, 2001, <URL:http//download.cent.com/downloads/0-3364666-100-5210875.html., 2 pages.

"Mr. KillAd", webpage online, C/net.Downloads.com, retrieved on Oct. 4, 2001, URL:http//download.cent.com/downloads/0-10059-100-895339.html>, 2 pages.

"Nagger", webpage online, C/net Downloads.com, retrieved on Oct. 4, 2001, URL:http//download.cnet.com/downloads/0-33567-46-100-2497932 html>, 2 pages.

"NoAds 2000.6.30.1", webpage online, South Bay Software, retrieved Oct. 4, 2001, URL:http//www.southbaypc.com/NoAds.html, 2 pages.

"NoPops 1.1", webpage online, WebAttack.com, retrieved on Oct. 4, 2001, URL:http/www.webattach.com/get/noppers.html>, 1 page.

"Paraben's AdStopper", webpage online, C/net Downloads.com, retrieved on Oct. 4, 2001, URL:http//downloads.cnet.com/downloads/)-10059-100-2643648.html>, 2 pages.

International Search Report and Written Opinion from International Application No. PCT/US05/29615 mailed Mar. 9, 2006, 11 pages.

"Popki Popup Closer 1.4", webpage online, WebAttach.com, retrieved on Oct. 4, 2001, URL:http//www.webattack.com/get/popki.shtml.>, 1 page.

"PopKill", webpage online, C/net Downloads.com, retrieved on Oct. 4, 2001, URL:http//download.cent.com/downloads/0-10059-100-6967054.html>, 2 pages.

"PopNot" webpage online, C/net Downloads, retrieved on Oct. 4, 2001, URL:http/downloads/0-100-5112702.html>, 2 pages.

"Popup Hunter", webpage online, C/net Downloads.com, retrieved on Oct. 4, 2001, URL:http/download.cnet.com/downloads/o-10059-100-1451171.html>, 2 pages.

"PopUp Killer" webpage online, C/net Downloads.com, retrieved on Oct. 3, 2001, URL:http//download.cnet.com//0-10059-100-7253644.html>, 2 pages.

"PopUp Smasher"webpage online, C/net Downloads.com, retrieved on Oct. 4, 2001, URL:http//download.cnet.com/0-3364664-100-7209048.html>, 2 pages.

"Pop-up Stopper", webpage online, C/net Downloads.com, retrieved on Oct. 3, 2001, URL:http//download.cnet.com/downloads/0-1059-100-6803957.sub--html&-gt, 2 pages.

"PopupDummy!", webpage online, C/net Downloads.com, retrieved on Oct. 4, 2001, URL:http//download.cnet.com/downloads/0-10059-100-6943327.html>, 2 pages.

The Privacy and Electronic Communications (EC Directive) Regulations 2003 (ECR), No. 2426, Electronic Communication, Sep. 2003, 22 pages.

U.S. Appl. No. 11/207,592 Office Action, mailed Jun. 24, 2008, 15 pages.

U.S. Appl. No. 11/417,282 Office Action, mailed Apr. 27, 2010, 19 pages.

U.S. Appl. No. 10/056,932 Office Action, mailed May 7, 2004,.

Cooley, R., et al., "Web Mining: Information and Pattern Discovery on the World Wide Web", TAI1997, Newport Beach, CA, Nov. 3-8, 1997, pp. 558-567.

Fenstermacher, Kurt D., et al., "Client-Side Monitoring for Web Mining", Journal of the American Society for Information Science and Technology, vol. 54, No. 7, Wiley Periodicals, Inc., © 2003, pp. 625-637.

Nelte, Michael, et al., "Cookies: Weaving the Web into a State", Crossroads—The ACM Student Magazine, vol. 7, Issue 1, Sep. 2000, pp. 1-8.

Claypool, Mark, et al., "Inferring User Interest", IEEE Internet Computing, vol. 5, Issue 6, Nov./Dec. 2001, pp. 32-39.

Montgomery, Alan, et al., "Learning About Customers Without Asking", Carnegie Mellon University, Tepper School of Business, Pittsburgh, PA, 35 pages, Jan. 2002.

Undsay Smith, "A Tatorlal on Principal Components Analysis", Feb. 26, 2002, 27 pages.

Visual Search ToolBar—Graphically Enhance Search Results, 2004, Viewpoint Corporation; webpage online, retrieved Oct. 7, 2004., URL:http://www.viewpoint.comtpub/toolbar/download.html.

PopUp Eraser, Webpage online, C/net Downloads.com, retrieved Oct. 4, 2001, retrieved from the Internet at URL:http/download.cnet.com/downloads/0-1 0059-1 00-5322841. html.

International Preliminary Report on Patentability from International Application No. PCT/US06/025102 mailed Jul. 26, 4 pages.

International Preliminary Report on Patentability from International Application No. PCT/US06/025104 mailed Jan. 23, 2007, 5 pgs.

International Preliminary Report on Patentability from International Application No. PCT/US07/061944 mailed Feb. 14, 2008, 4 pgs.

International Preliminary Report on Patentability from International Application No. PCT/US06/008049 mailed Oct. 19, 2007, 4 pages.

International Preliminary Report on Patentability from International Application No. PCT/US06/008050 mailed Oct. 19, 2007, 4 pages.

International Preliminary Report on Patentability from International Application No. PCT/US06/025103 mailed Jan. 29, 2008, 4 pages.

International Preliminary Report on Patentability from International Application No. PCT/US06/009954 mailed Aug. 30, 2006, 6 pages.

Supplemental Notice of Allowability mailed Aug. 7, 2008 from U.S. Appl. No. 11/207,589, 4 pages.

"Shopping with WhenUShop", webpage online, WhenU.com, retrieved Mar. 19, 2002, URL:http//www.whenu.com.

"SideStep, The Traveler's Search Engine"; webpage online, retrieved on Oct. 7, 2004, URL:http://www.sidestep.com/mainhtml.

International Search Report and Written Opinion from International Application No. PCT/US04/03377 mailed Jan. 19, 2006, 6 pages.

International Search Report and Written Opinion from International Application No. PCT/USOS/01022 mailed Apr. 24, 2006, 8 pages.

International Search Report and Written Opinion from International Application PCT/US2005/029615 mailed Mar. 9, 2006.

(56) References Cited

OTHER PUBLICATIONS

International Search Report and Written Opinion from International Application PCT/US2005/35352 mailed Sep. 11, 2007, 8 pages.
Final Office Action mailed Mar. 25, 2011 from U.S. Appl. No. 11/420,191, 45 pages.
Final Office Action mailed Feb. 16, 2011 from U.S. Appl. No. 11/688,160, 15 pages.
International Preliminary Report on Patentability and Written Opinion from International Application No. PCT/US05/035352 mailed Sep. 11, 2007.
International Preliminary Report on Patentability from International Application No. PCT/US2005/029615 mailed Mar. 9, 2006, 7 pages.
International Preliminary Report on Patentability from International Application No. PCT/US2005/035352 mailed Sep. 11, 2007, 6 pages.
International Preliminary Report on Patentability from International Application No. PCT/US06/09954 mailed Aug. 30, 2006, 6 pages.
International Preliminary Report on Patentability from International Application No. PCT/US023386 mailed Jul. 12, 2007, 7 pages.
U.S. Appl. No. 10/061,107 Office Action, mailed Nov. 2, 2005, 10 pages.
Ishitani, Lucila et al., "Masks: Bringing Anonymity and Personalization Together" IEEE Security & Privacy, vol. 1, Issue 3, May/Jun. 2003, pp. 18-23.
IRTORG Internet Related Technologies Home Articles FAQs Games BBS Resources Software News Books Downloads About Beta Find, irt.org—JavaScript Windows FAQ Knowledge Base, Jun. 3, 2006, 24 pages.
Katski, D., "Web Magician" RocketDownload.com, Http://www.rocketdownload.com/Details/Inte/Webmag.html, Oct. 4, 2004, 2 pages.
Zero Popup, http://download cnet.com/downloads/0-3356748-100-7163307.html, Sep. 14, 2001, 2 pages.
U.S. Appl. No. 11/427,226 Office Action, mailed Aug. 3, 2009, 10 pages.
U.S. Appl. No. 11/427,243 Office Action, mailed Feb. 4, 2010, 11 pages.
U.S. Appl. No. 11/427,226 Office Action, mailed Jun. 7, 2010, 25 pages.
U.S. Appl. No. 11/427,282 Office Action, mailed Aug. 10, 2009, 9 pages.
U.S. Appl. No. 11/207,590 Office Action, mailed Oct. 10, 2007, 13 pages.
U.S. Appl. No. 11/427,243 Office Action, mailed May 10, 2011, 24 pages.
U.S. Appl. No. 111427,243 Office Action, mailed May 10, 2011, 24 pages.
U.S. Appl. No. 11/207,590 Office Action, mailed Mar. 26, 2010, 8 pages.
U.S. Appl. No. 11/207,590 Office Action, mailed Jun. 22, 2009, 8 pages.
U.S. Appl. No. 111207,592 Office Action, mailed Jun. 24, 2008, 15 pages.
U.S. Appl. No. 10/700,820 Office Action, mailed May 24, 2007, 15 pages.
U.S. Appl. No. 10/700,820 Office Action, mailed Apr. 25, 2016, 7 pages.
U.S. Appl. No. 10/700,820 Office Action, mailed Dec. 26, 2006, 19 pages.
U.S. Appl. No. 11/207,592 Office Action, mailed Feb. 25, 2009, 7 pages.
U.S. Appl. No. 11/427,243 Office Action, mailed Jun. 25, 2009, 8 pages.
U.S. Appl. No. 10/061,107 Office Action, mailed Aug. 13, 2003, 5 pages.
U.S. Appl. No. 10/700,820 Office Action, mailed Sep. 13, 2006, 11 pages.
U.S. Appl. No. 10/061,107 Office Action, mailed Jan. 14, 2004, 10 pages.
U.S. Appl. No. 10/056,932 Office Action, mailed Sep. 16, 2004, 9 pages.
U.S. Appl. No. 10/056,932 Office Action, mailed Mar. 18, 2005,8 pages.
U.S. Appl. No. 111417,282 Office Action, mailed Apr. 27, 2010, 19 pages.
U.S. Appl. No. 10/056,932 Office Action, mailed Jul. 27, 2005, 7 pages.
U.S. Appl. No. 11/207,590 Office Action, mailed Oct. 27, 2010, 10 pages.
U.S. Appl. No. 11/207,592 Office Action, mailed Sep. 24, 2007, 13 pages.
U.S. Appl. No. 10/061,107 Office Action, mailed Sep. 28, 2010, 13 pages.
U.S. Appl. No. 10/056,932 Office Action, mailed Sep. 5, 2003, 6 pages.
U.S. Appl. No. 10/056,932 Office Action, mailed May 7, 2004, 6 pages.
U.S. Appl. No. 11/207,589 Office Action, mailed Oct. 19, 2007, 10 pages.
U.S. Appl. No. 10/061,107 Office Action, mailed May 5, 2006, 12 pages.
"Plug-n-Play Java Script", Kevin Ready, et al., New Riders Publishing, Indianapolis, IN, Oct. 1996, 11 pages.
"Surf in Peace 2.01 "webpage online, WebAttack.com, retrieved on Oct. 4, 2001, URL:http/download.cnet.com/URL:http//www.webattach.corn/get/sip.shtml>, 2 pages.
Non-Final Office Action mailed Oct. 16, 2007 from U.S. Appl. No. 11/210,209, 5 pages.
Non-Final Office Action mailed Jun. 23, 2006 from U.S. Appl. No. 11/211,197, 4 pages.
Final Office Action mailed May 10, 2011 from U.S. Appl. No. 11/427,243, 24 pages.
"Ultraseek Server Detailed Feature List", http://software.infoseek.com/products/ultraseek/ultrafeatures.htm., Accessed from Apr. 1998, archive from http:web.archive.org/web/19980419092128/https:;;software.infoseek.com/products/ 8 pages.
KIPO Office Action Dated Nov. 23, 2010, 8 pages.
International Search Report and Written Opinion from International Application No. PCT/USOS/45722 mailed Jan. 19, 2007, 12 pages.
International Search Report and Written Opinion mailed from International Application No. PCT/US2006/025103 mailed Jan. 29, 2008, 6 pages.

\* cited by examiner

| Version of crumb 602 | Time written 604 | Commercial Flag 606 | Keyword 608 | Character Set 610 |
|---|---|---|---|---|
| 3 | secs since 1970 hex. eg: 4166FAFC | 0 = no, 1 = yes, 2 = unknown (always 1) | 2005 Chevrolet Corvette | utf-8 |

FIG.6

| CallID 802 | Day 702 | 0 | -1 | -2 | -3 |
|---|---|---|---|---|---|
| 10494 | Hit? 704 | 1 | 0 | 1 | 1 |

FIG. 7

| CategoryID 802 | Recency 804 | Frequency 806 | Banner Clicks 808 |
|---|---|---|---|
| 10494 | 3 | 4 | 1 |
| 98409 | 1 | 6 | 4 |
| 65625 | 14 | 6 | 3 |
| 68530 | 1 | 0 | 0 |
| 147374 | 12 | 0 | 0 |

| Comment 810 |
|---|
| |
| Heavy and recent |
| Heavy last month |
| Light but recent |
| Light last month |

FIG. 8

| Bucket # | 0 | 1 | 2 | 3 | 4 | 5 | 6 | 7 |
|---|---|---|---|---|---|---|---|---|
| Time Slice | N/A | 0-5 min | 5-15 min | 15-30 min | 30-60 min | 1-2 hrs | 2-4 hrs | 4-12 hrs |
| Bucket # | 8 | 9 | 10 | 11 | 12 | 13 | 14 | 15 |
| Time Slice | 12-24 hrs | 1-3 days | 3-7 days | 7-14 days | 14-21 days | 21-30 days | 30-45 days | 45-60 days |

FIG. 9

| Bucket # | 0 | 1 | 2 | 3 | 4 | 5 | 6 | 7 |
|---|---|---|---|---|---|---|---|---|
| # Days w/ a visit | 0 | 1 | 2 | 3 | 4 or 5 | 6 to 10 | 11 to 30 | 31 to 60 |

FIG. 10

| CategoryID 1102 | Category leaf name 1104 | Revenue Priority 1106 |
|---|---|---|
| 9870 | Uncategorized | 0 |
| 10494 | Luxury Auto | 1 |
| 98409 | SUVs | 2 |
| 65625 | Payroll Software | 3 |
| 68530 | Florida except Orlando | 4 |

FIG. 11

METHOD AND DEVICE FOR PUBLISHING CROSS-NETWORK USER BEHAVIORAL DATA

CROSS REFERENCE TO RELATED APPLICATIONS

This application is a continuation of U.S. Ser. No. 16/041,232, filed Jul. 20, 2018; which is a continuation of U.S. Ser. No. 15/278,533, filed Sep. 28, 2016, now U.S. Pat. No. 10,033,716, which is a continuation of U.S. Ser. No. 12/715,311, filed Mar. 1, 2010, now U.S. Pat. No. 9,495,446, which is a continuation of U.S. Ser. No. 11/226,066, filed Sep. 14, 2005, now U.S. Pat. No. 7,693,863, which claims priority from Provisional Application 60/637,684, filed Dec. 20, 2004, all of which are hereby incorporated by reference herein.

This application is related to commonly owned U.S. application Ser. No. 10/289,123, now U.S. Pat. No. 7,512,603, entitled "Responding to End-User Request for Information in a Computer Network" by inventors Eugene A. Veteska, David L. Goulden, and Anthony G. Martin, filed on Nov. 5, 2002, and issued on Mar. 31, 2009. The related application is also incorporated by reference.

BACKGROUND

The present invention relates to summarizing cross-network user behavioral data and further relates to restoring damaged data structures, either data structures summarizing cross-network user behavioral data or data structures remotely identifying to logic running on a user computer. The summarizing cross-network user behavioral data may particularly include publishing the data to one or more data structures that become accessible to a server hosting an authorized domain when a user accesses the authorized domain. The restoring of damaged data structures may particularly include automatically detecting deletion of or damaged to data structures and restoring the damaged data structures.

Advertising is most successful when it matches the viewer's desires. When the viewer uses a client computer to surf the web and visit websites hosted by servers, advertising can be targeted. One way to target users is to provide sponsored links in response to a search, using a search engine such as the engines provided by Google and Yahoo. Another way is to trigger advertising when a user visits a website, for instance using a so-called web beacon. Cookies can be used to identify a user that is searching or visiting a website and match the user to a server-side database that selects advertising to deliver. Server-side databases currently reflect information collected by servers connected to websites that users visit. Websites that are aggregated into a particular server-side database can be described as belonging to a user behavior collection network.

An opportunity arises to better target users, taking advantage of client software running on the client computer. Client-side software can monitor a user's web browsing activity, regardless of whether websites visited belong to a first or second user behavior collection network or no network at all. New technology can publish user behavior data during browsing and reduce or eliminate reliance on matching the user to the server-side database.

SUMMARY OF THE INVENTION

The present invention relates to summarizing cross-network user behavioral data. The summarizing cross-network user behavioral data may particularly include publishing the data to one or more data structures that become accessible to a server hosting an authorized domain when a user accesses the authorized domain. Particular aspects of the present invention are described in the claims, specification and drawings.

BRIEF DESCRIPTION OF THE DRAWINGS

FIG. 6 is an example of a cookie that stores the most recent commercial keyword of interest.

FIG. 7 is an example of summary data maintained by the behavior watcher that may be written to persistent memory.

FIG. 8 illustrates a bit string further summarized by category.

FIG. 9 illustrates buckets that may be applied to recency of using search words, clicking through, entering URL destinations or other indications of user interest.

FIG. 10 illustrates buckets that can be applied to user category involvement.

FIG. 11 illustrates how a category ID can be associated with both the category name and a revenue priority.

DETAILED DESCRIPTION OF EXEMPLARY EMBODIMENTS

The following detailed description is made with reference to the figures. Preferred embodiments are described to illustrate the present invention, not to limit its scope, which is defined by the claims. Those of ordinary skill in the art will recognize a variety of equivalent variations on the description that follows.

To illustrate an environment in which the present invention may be useful, we point to and incorporate by reference U.S. application Ser. No. 10/289,123, now U.S. Pat. No. 7,512,603, entitled "Responding to End-User Request for Information in a Computer Network" by inventors Eugene A. Veteska, David L. Goulden, and Anthony G. Martin, filed on Nov. 5, 2002, and issued on Mar. 11, 2009. Some of the discussion that immediately follows is borrowed from the prior application, which is commonly owned, but much is recast to a new paradigm of assembling user profile information client-side and publishing it using cookies.

Although embodiments of the present invention are described herein in the context of the Internet, the present invention is not so limited and may be used in other data processing applications.

Figure 1:
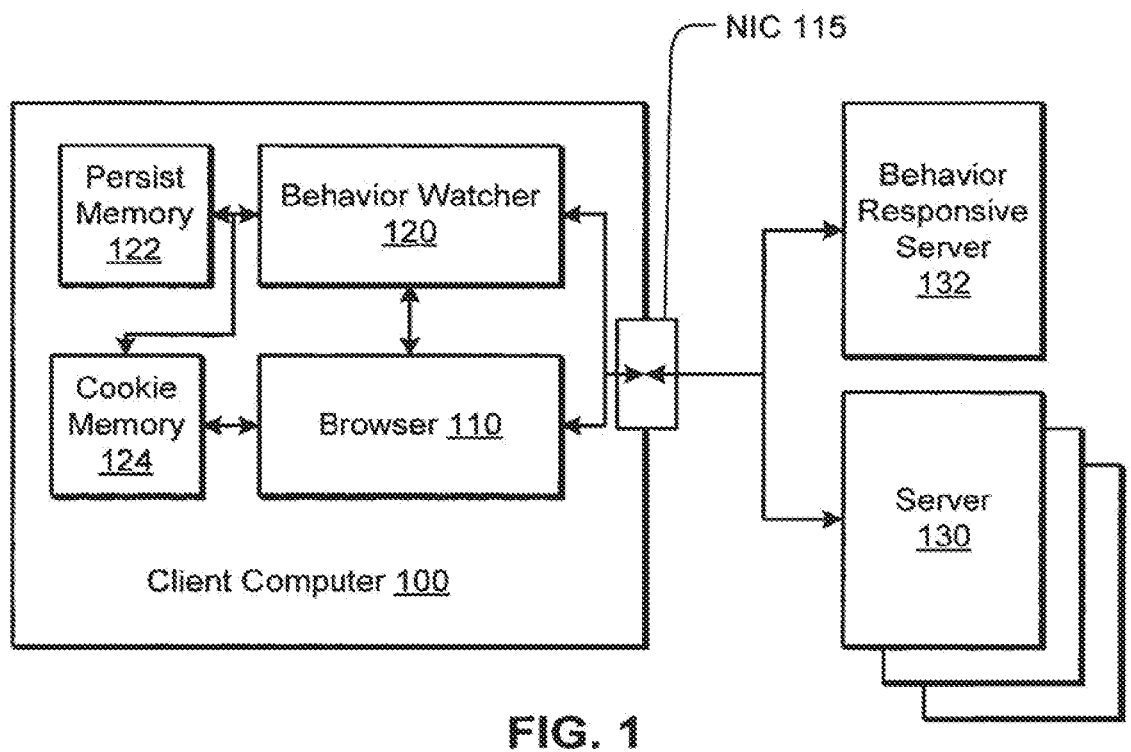
FIG. 1 is a schematic illustration of a client computer interacting with a server and a behavior responsive server.

FIG. 1 is a schematic illustration of a client computer 100 interacting with a server 130 and a behavior responsive server 132. In FIG. 1, an end-user on a client computer indicates their interest in a subject by submitting a search request to a search engine, typing a URL or clicking on a link or banner ad. Their interest becomes a request across on a network such as the Internet. A search engine may perform an Internet-wide search, or a search limited to a particular web site or domain name, or a search limited in some other way. The search request may be a query comprising one or more keywords, for example. The original search engine server 130 responds to the search request by sending a search result to the client computer 100. The search result may include a list of documents (e.g., web pages), links to documents, or other information relating to the keywords. A specific example of the just described scenario is an end-user typing the keyword "car" in a search engine and receiving back links to web sites that talk about car clubs, exotic cars, car racing, and like information.

A user submits a search request because of the user's interest in a topic. To make good use of the information about a user's interest, a behavior watching and/or behavior summarizing program 120 resident in the client computer listens for requests, for instance made using a browser 110 or other hyperlink enabled programs such as word processors or presentation programs. It listens for requests for information such as a search request, a click-through on a banner ad, or entry into the browser or click through of a destination URL. When the behavior watching program 120 detects that an end-user is performing a search or otherwise indicating their interest in a web site or subject, the behavior watching program records the interest. The interest may be recorded to program memory or to a persistent memory 122. When a user clicks on an advertisement related to the end-user's search request, the probability that the end-user will be interested in one or more related advertisements increases. In the car example, just above, the behavior watching program may note that the search was followed by certain click-throughs.

The behavior watcher 120 is resident in the client computer 100 so that it can respond to an end-user's search request even when the end-user uses different search engines. That is, unlike other targeting techniques that only work when an end-user is on a particular web site, the behavior watching program observes user interest across different search engines, web sites and even browsers. An end-user may obtain the behavior watching program by itself or along with free or reduced-cost computer programs, services, and other products.

The behavior responsive server 132 presents a new approach to providing content responsive to recent user behavior. User behavior has in the past been observed using a cookie with a unique user ID that allows server-side tracking. Server aggregated user behavior data is compiled among an organization of cooperating server owners. Cooperation may relate to ad serving (e.g., Double-Click), portals (e.g., Yahoo), search engines (e.g., Google) or other organizational basis. Cooperation in this sense is contractual more than technical. Server aggregated user behavior data is used, for instance, by an ad server when a web beacon (a small, null image with a URL pointing to an ad server) contacts the ad server and causes a unique user ID cookie to be transmitted. The ad server accesses a database, to update user behavior data with the new contact. The ad server could also access data from the server aggregated database, based on the unique user ID. A serious limitation of server aggregated user behavior data is that it is limited to contacts detected by cooperating servers when the user accesses cooperating web sites and the user's unique user ID cookie is transmitted. Mismatches of unique user IDs or multiple unique user IDs for the same user diminish the effectiveness of server-side aggregation. The combination of client-side user behavior tracking 120 and a reported-behavior responsive server 132 presents a new approach.

A reported-behavior responsive server 132 accepts one or more messages (e.g., cookies) that report recent user behavior as a basis for deciding among potential messages (e.g., banner ads) which message to give the user. The reported-behavior responsive server 132 need not access a server-side user behavior database to decide which message to send. Those of skill in the art will recognize that the new paradigm of reported behavior could be combined with server-side aggregation and that that combination also would be novel.

Figure 2:
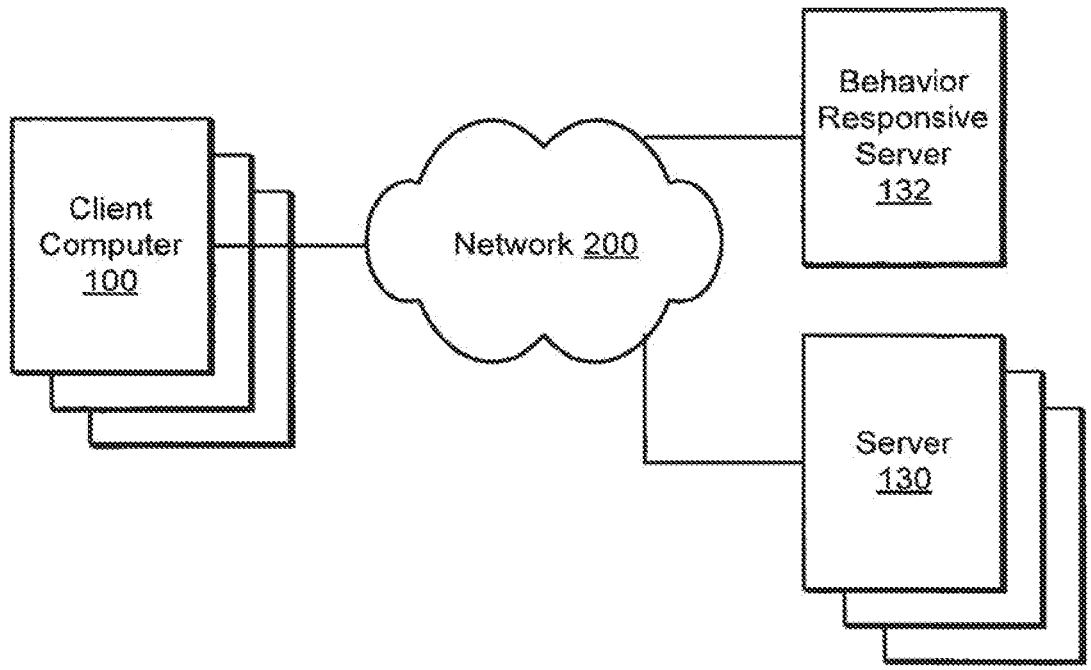
FIG. 2 illustrates a schematic diagram of a computer network.

FIG. 2 is shown a schematic diagram of a computer network. Network 200 may include one or more client computers 100, one or more web server computers 130, one or more behavior responsive server computers 132, and other computers not shown. Intermediate nodes such as gateways, routers, bridges, Internet service provider networks, public-switched telephone networks, proxy servers, firewalls, and other network components are not shown for clarity. In the example of FIG. 2, network 200 includes the Internet; however, other types of computer networks may also be used. Computers may be coupled to network 200 using any type of connection 115 without detracting from the merits of the present invention.

A client computer 100 is typically, but not necessarily, a personal computer such as those running the Microsoft Windows™, Apple Macintosh™, Linux, or UNIX operating systems. An end-user may employ a suitably equipped client computer 100 to get on network 200 and access computers coupled thereto. For example, a client computer 100 may be used to access web pages from a web server computer 130. It is to be noted that as used in the present disclosure, the term "computer" includes any type of data processing device including personal digital assistants, digital telephones, wireless terminals, and the like.

A web server computer 130 may host a web site containing information designed to attract end-users surfing on the Internet. A web server computer 130 may host or cooperate with another server that hosts advertisements, downloadable computer programs, a search engine and products available for online purchase. A web server computer 130 may also host or cooperate with an ad server for that delivers advertisements to a client computer 100.

A reported-behavior responsive server computer 132 serves message units for delivery to a client computer 100. The message units may contain advertisements, for example. Message units are further described below. A reported-behavior responsive server computer 132 may also host downloadable computer programs and files for supporting, updating, or maintaining components on a client computer 100.

Web server computers 130 and reported-behavior responsive server computer 132 are typically, but not necessarily, server computers such as those available from Sun Microsystems, Hewlett-Packard, Dell or International Business Machines. A client computer 100 may communicate with a web server computer 130 or a reported-behavior responsive server computer 132 using client-server protocol. It is to be noted that client-server computing will not be further described here.

The components of a client computer 100 are not illustrated in a separate figure, but are well-understood. In one embodiment, the components of client computer 100 shown in FIG. 1 are implemented in software. It should be understood, however, that components in the present disclosure may be implemented in hardware, software, or a combination of hardware and software (e.g., firmware). Software components may be in the form of computer-readable program code stored in a computer-readable storage medium such as memory, mass storage device, or removable storage device. For example, a computer-readable medium may comprise computer-readable code for performing the function of a particular component. Likewise, computer memory may be configured to include one or more components, which may then be run by a microprocessor. Components may be implemented separately in multiple modules or together in a single module.

As shown in FIG. 1, client computer 100 may include a web browser 110 and a behavior watching program 120. Web browser 110 may be a commercially available web browser or web client running on a client computer 100. In one embodiment, web browser 201 is the Microsoft Internet Explorer™ web browser. In another, it is a Mozilla, Netscape or Apple web browser. Alternatively, a web enabled word processor or presentation program may be monitored by the behavior watcher 120.

The behavior watching program 120 may be downloadable from a message server computer 103. Behavior watching program 120 may be downloaded in conjunction with the downloading of another computer program. For example, behavior watching program 120 may be downloaded to a client computer 100 along with a utility program that is provided free of charge or at a reduced cost. The utility program may be provided to an end-user in exchange for the right to deliver messages to the end-user via behavior watching program 120. In essence, revenue (e.g., advertising fees) from messages delivered to the end-user helps defray the cost of creating and maintaining the utility program. Other components such as operating system components, utility programs, application programs, and the like are not shown for clarity of illustration.

Figure 3:
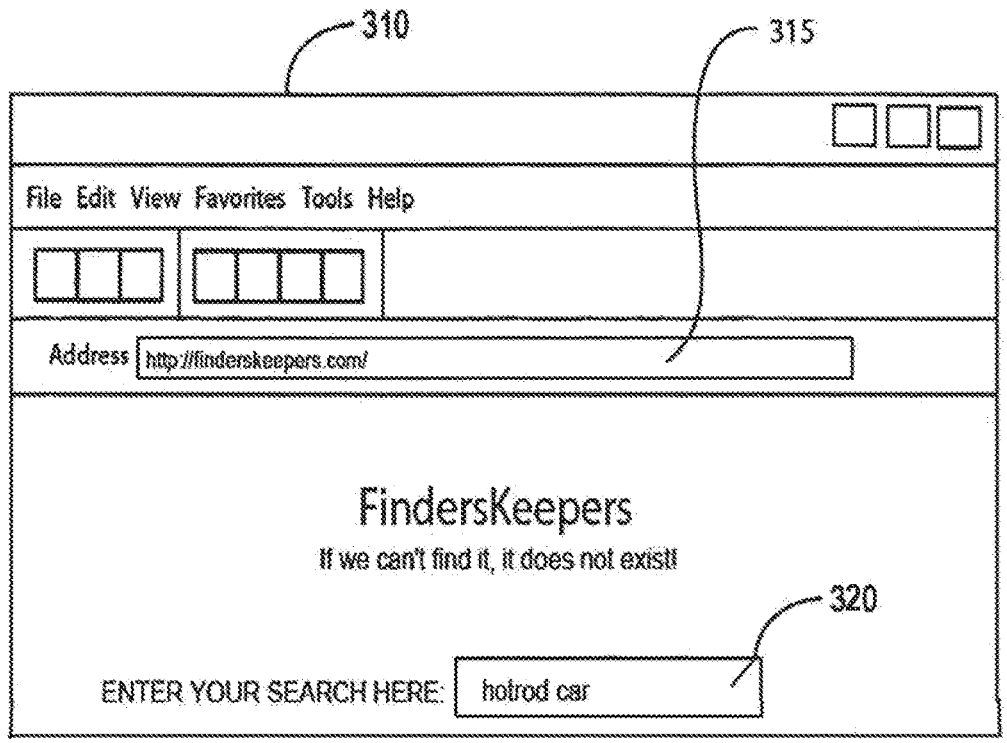
FIG. 3 illustrates browsing to a search engine "FinderSkeepers".

The behavior watcher 120 includes computer-readable program code that compiles a user profile from behavior watching. It monitors web browser 120 for search requests, uniform resource locator (URLs) of web sites visited by an end-user surfing on the Internet and ad click-throughs. FIG. 3 illustrates browsing to a search engine "FindersKeepers". A user invokes a browser 310 and enters the address of the search engine in an address window 315. Of course, links, buttons, a search bar component or a dedicated searching program (for instance, from the systray) can connect a user with a search engine, through a browser or other program. The address remains visible when the page for the web site is displayed. The user enters search terms "hotrod car" in a window 320. A request is sent or "posted" to the search engine.

Figure 4:
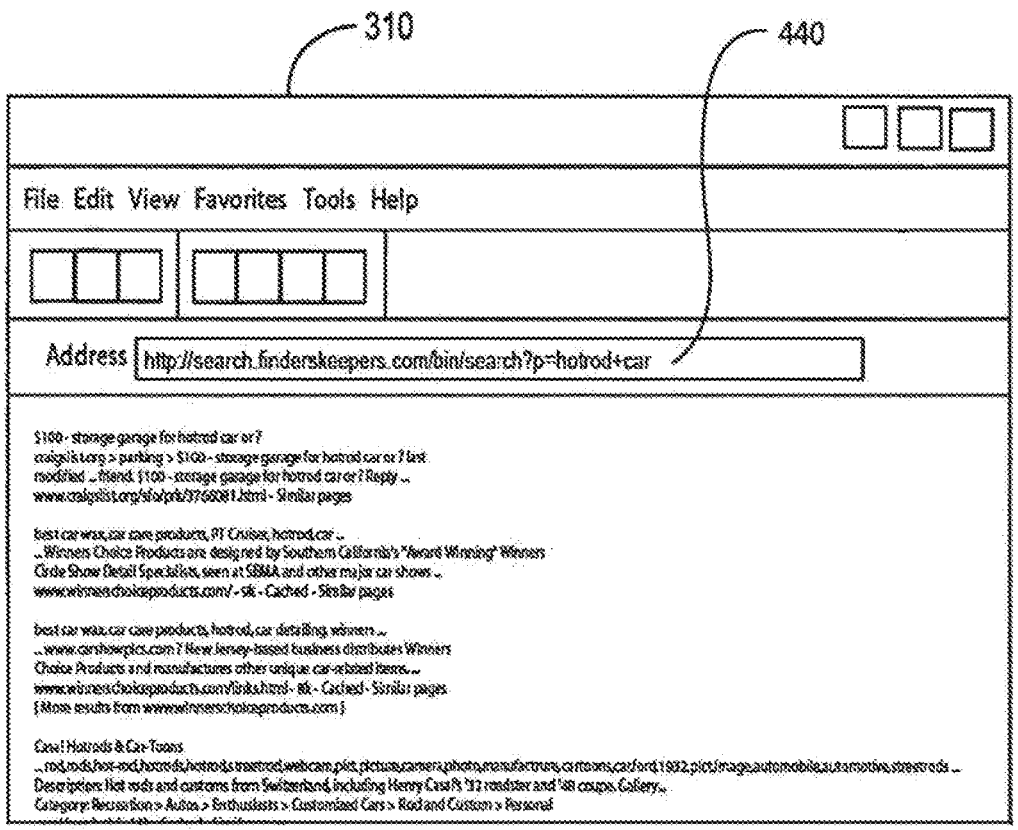
FIG. 4 shows a browser displaying search results.

FIG. 4 shows a browser 310 displaying search results. Part of the behavior watcher 120 may parse a search request, as part of the process of compiling a user profile. In one embodiment, the behavior watcher 120 parses a search request a URL displayed in the address window of a web browser in response to a search request, to extract one or more keywords. Popular search engines respond to a search request by pointing the web browser employed by the end-user to a web page containing the search result. The URL of that web page may be parsed to extract the keywords chosen by the end-user for his search. For example, performing a search for "hotrod" and "car" in a fictitious search engine referred to herein as "finderskeepers.com" will result in a web browser being pointed to a web page with the URL, http://search.finderskeepers.com/bin/search?p=hotrod+car.

The web page with the URL earch.finderskeepers.com/bin/search?p=hotrod+car" contains the search result for the keywords "hotrod" and "car". Knowing the URL format employed by finderskeepers.com allows extraction of the words following " . . . /search?p=" and separated by "+". String manipulation functions may be used to extract keywords from the URL. It is to be noted that different search engines may employ different URL formats. Accordingly, a keyword extractor component of the behavior watcher may first parse the URL to determine the name of the search engine, and then employ parsing rules for that search engine. In the present example, keyword extractor may first parse the URL "http://search.finderskeepers.com/bin/search?p=hotrod+car" to get the name of the search engine, which is " . . . finderskeepers.com/ . . . ", and then apply parsing rules for finderskeepers.com. Keyword extractor may take advantage of delimiters and end of string indicators employed by a particular search engine to parse a URL. In one embodiment, keyword extractor includes parsing rules for popular search engines. The keyword extractor also may act on entry or click-throughs of URLs and click-throughs of banner ads, to cross-reference those interest indications to key words. A keyword extractor is further described in the application incorporated by reference.

Figure 5:
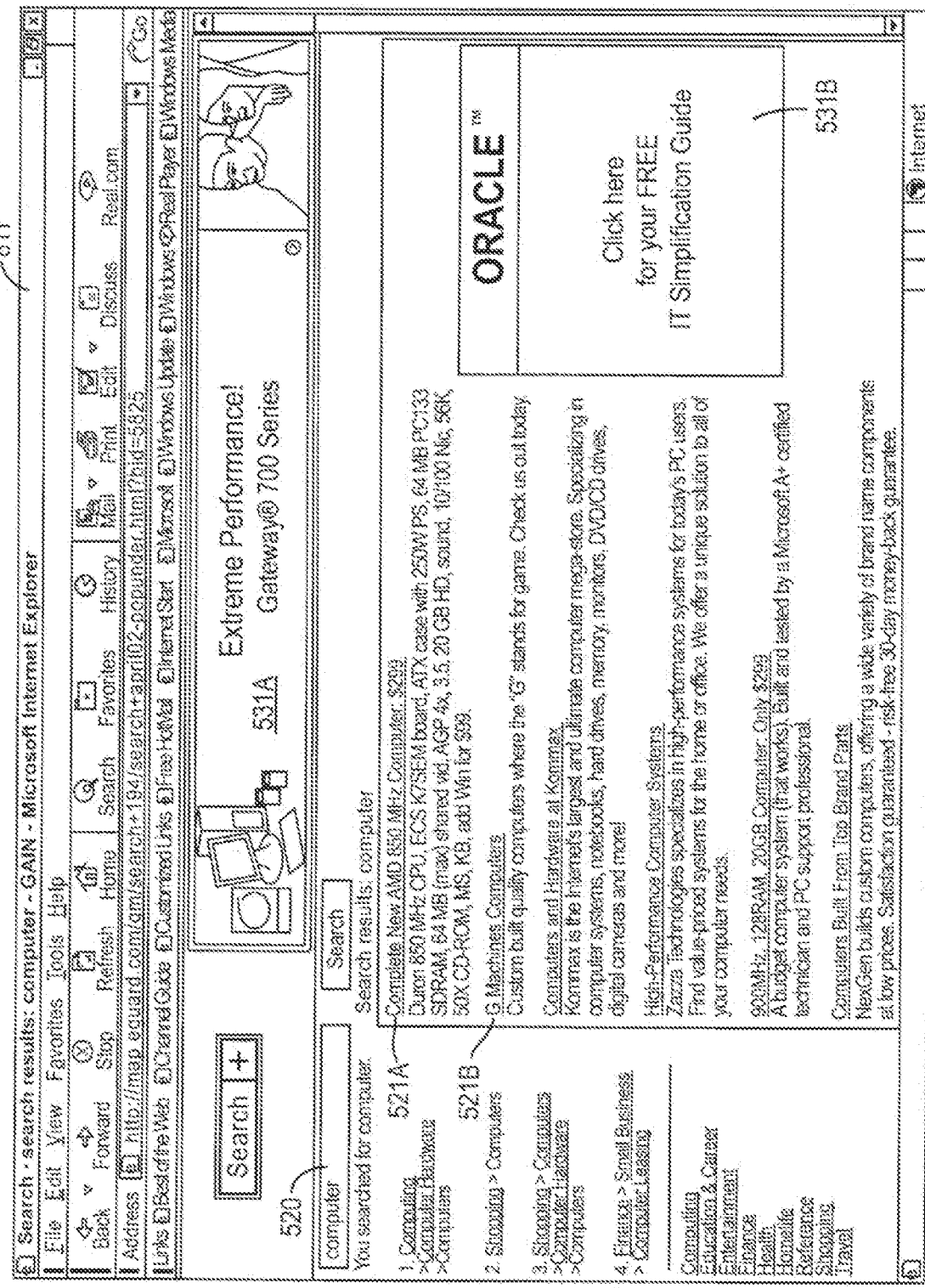
FIG. 5 depicts a page in a familiar browser for a "Search+" web site.

FIG. 5 depicts a page in a familiar browser 310 for a "Search+" web site. The familiar address window appears just below the button bar and above a tool bar. A search window 520 accepts keyword searches. Search results 521A, 521B are displayed in the body of the browser. Banner ads, which a user is welcome to click through, are positioned at the top 531 and right side 531B of the display.

Referring back to FIG. 4, a keyword extractor also may include a keyword file. In one embodiment, keyword file is a text file containing a list of relevant keywords referred to as "an include list" and a list of non-relevant keywords referred to as an "exclude list". Note that keyword file may have also have an include list but not an exclude list or vice versa. Keyword file may be downloadable from a server computer 130 to ensure that client computer 100 always has the most current keyword file. Keywords in the include list can be assigned to categories of interest, whereas keywords in the exclude list have no corresponding categories of interest. Keywords in the include list are processed by a keyword processor, whereas keywords in the exclude list are not processed. In one embodiment, keyword processor processes a keyword by sending the keyword to message server computer 130 to obtain further information about the keyword. By first examining the exclude list before sending keywords to message server computer 103, keywords that have no corresponding message units are identified at client computer 100, thereby minimizing traffic to message server computer 103. Likewise, traffic to message server computer 103 may be minimized by first determining if a keyword is in the include list before sending the keyword to message server computer 103.

TABLE 1

| Include List | Exclude List |
| --- | --- |
| hotrod | paper |
| car | the |
| books | for |
| computer | Britney |
| cellular | . . . |
| sports | . . . |
| wine | . . . |
| . . . | . . . |

In the example of Table 1, the exclude list includes non-relevant words such as commonly used words that are too general to be useful. The exclude list may also include words that have no commercial value. For example. "Britney" may have no commercial value to most advertisers except those affiliated with or licensed by Britney the pop-star.

In the example of Table 1, the include list includes relevant words. In one embodiment, a word is considered relevant if there is a corresponding message unit for that word. For example, the word "computer" may be relevant if there is a message unit containing an advertisement for a personal computer. Similarly, the word "book" may be relevant if there is a message unit relating to books.

Data collected by the behavior watcher 120 is illustrated by FIGS. 5-11. Data is collected to generate a client-side profile. These profiles allow ad servers, which receive reported user behavior data, to improve ad performance. Advertisers will pay more for ads that are directed to interested customers than for ads that are distributed randomly. Moreover, ad impressions that generate click-throughs generate more revenue than ads that are displayed but evoke no response. Ad performance can be improved either by better targeting or greater success in generating click-throughs.

A client-side profile includes things like category visits, searches, user identification, language and time zone. Indications of user interest are assigned to categories. In one embodiment, 200-300 categories are recognized. Of course, fewer or more categories might be recognized. The more categories recognized, the more data bits required to store category IDs. Potentially, categories could be organized hierarchically. Recency may be recorded by time bins, such as within the last hour, 1-2 hours, 2-4 hours, 4-24 hours, 1-7 days, 7-30 days, 31-60 days. Alternatively, bins or categories for 7-14 days, 0-5 minutes, 5-15 minutes, 15-30 minutes and 30-60 minutes may be of interest. Searches for key words of commercial interest may be more important than some other indications of user interest. The behavior watcher 120 may keep track of the last commercial keyword entered in a search and a time bucket for the last commercial keyword entered. Over a certain outer history limit, the time bucket may be empty. Machine-related information may include a unique machine ID, language settings, time zone of the user, and installation date of the relevant software. Data stored either to persistent memory 122 or cookie memory 124 may can be compressed and encrypted to save space and prevent hacking. Compression, beyond the categorization described, and encryption schemes are well known and not described here. Cookies, at least, should include version number so that the server receiving the cookie will understand how to interpret the cookie. Other header information may be supplied as desired. Cookies tracking user behavior are written by the behavior watcher 120, as opposed to the server 130.

Machine information is one type of data that may be stored in persistent memory 122 and cookies 124. The information associated with the machine may include version of the cookie, the time written, a unique ID, a locale (such as a ZIP code, area code or something similar), user's time zone, and an application name, version and installation time. Machine information may be rewritten to memory every 24 hours, every new day, or on some other periodic basis. It may be stored as columns separated by delimiters, then encrypted and compressed.

The behavior watcher may track and summarize visits. It may record, such as to persistent memory 122, each indication of user interest, including use of key words in searches, entry of URLs and click-throughs of URLs and banner ads. Banner ads may be segregated into regular banner ads, site exit banner ads that are triggered when leaving a particular URL, brander banner ads that are triggered when visiting a first URL, then displayed in visiting a second URL, and run of network banner ads that are triggered based on a count of navigations from one URL to the next.

FIG. 6 is an example of a cookie that stores the most recent commercial keyword of interest. This may be the most recent commercial keyword of interest from a search or a keyword associated with a URL or click-through. More than one recent commercial keyword of interest may be stored in one or more cookies, following the example of FIG. 6. One attribute or field of this cookie is the version of the crumb 602. Another is the time written 604, which may be expressed in seconds from 1970 to the time the cookie is written. A commercial flag 606 may be used to categorize the keyword type, for instance between key words that are of current commercial interest and key words that are for sale. The keyword may be included 608, either in text or as a shorthand code. A character set 610 such as UFT-8 may be included to assist with decoding of the keyword 608. This may be important in international applications.

FIG. 7 is an example of summary data maintained by the behavior watcher 120 that may be written to persistent memory 122. In this example, a category ID 802 is a shorthand for a particular category. Bins are allocated for a current period 702, such as a day. The periods may be of equal length for different lengths. In one embodiment, a bit string implements the bins. A history of 60 days may be implemented by 60 bits plus storage for a category ID. Each bin corresponds to a particular time segment. A bit flag indicates whether there was activity related to the category during the particular time segment. At a regular time corresponding to the shortest period represented by any bin, the bit string is updated. Data is shifted into older bins, making room in the most recent bin. Data regarding recent activity is summarized into the most recent bin, labeled zero in the figure. If bins represent unequal amounts of time, special provisions are made at the boundaries between shorter and longer time bins, either algorithmically or by allocating additional storage. For instance, activity during any one-hour segment during a preceding day may result in setting the bit flag in a day-long time segment. The day-long time segment is flag "0" only if the hour segment flag at midnight is "0" when the midnight update takes place. This is an example of an algorithmic provision at the boundary between a one-hour segment and a day-long segment. Alternatively, storage may be allocated for bins to record the number of visits in a particular time segment. This may significantly increase the amount of storage required, without necessarily changing how a reported-behavior aware server 132 responds. Compact storage is preferred when there are hundreds of categories and the practical limit for the size of a cookie is 2K to 4K bytes. Cookies can be sent to a server that archives user activity data. The user activity data can be used for analysis or targeting of ads. With the right user ID information, the user activity data could be matched to data from other sources, such as shopper loyalty programs or market research programs. A bit string can be further summarized by category, shown in FIGS. 8-10.

FIG. 9 illustrates buckets that may be applied to recency of using search words, clicking through, entering URL destinations or other indications of user interest. The most recent visit is recorded by membership in a particular bucket. Fifteen or 16 buckets can be indicated with four bits. In the figure, the buckets are of unequal length. A single, most recent visit record such as illustrated by FIG. 6 or an entry kept in memory can be used to assign a category to a particular bucket.

FIG. 10 illustrates buckets that can be applied to frequency of visits. When the bit string of FIG. 7 is organized by days, activity in a category can be assigned to buckets of different visit frequencies, such as 0, 1, 2, 3, 4 or 5, 6 to 10, 11 to 30, or 31 to 60 days out of the last 60 days in which the user indicated interest. The number of bits set in the bit string is counted and summarized using this categorization, as a measure of user category involvement.

With the categorical coding of recency and user category involvement in mind, we turn to FIG. 8. A single cookie may record data for many category ID's 802. For each category ID, three or more metrics of user interest may be recorded. One or more recency 804 categories can be recorded. The recording of recency can be applied to key words or other kinds of user interest indications, described above. One or more frequency 806 categories can be recorded, applied to key words or other kinds of user interest indications. Banner clicks 808 can be separately categorized by recency, frequency or both. The comments in column 810 are editorial comments to explain the data in the table. Category ID 98409 experienced heavy and recent user interest. Category ID 65625 experienced heavy user interest last month. Category ID 68530 experienced light, recent user interest. Category 147374 experienced light activity last month, which probably also should be reflected by a nonzero value under frequency 806.

The behavior watcher 120 preferably sorts the category history information in FIG. 8 so that the most important categories are listed first. Alternatively, the system could leave the category sorting to the reported-behavior responsive server 132. As illustrated in FIG. 11, a category ID 1102 can be associated with both the category name 1104 and a revenue priority 1106. It may be useful to sort category history information by revenue priority 1106, especially if only a portion of the client-sided user behavior data is transmitted to a reported-behavior responsive server 132.

Figure 12:
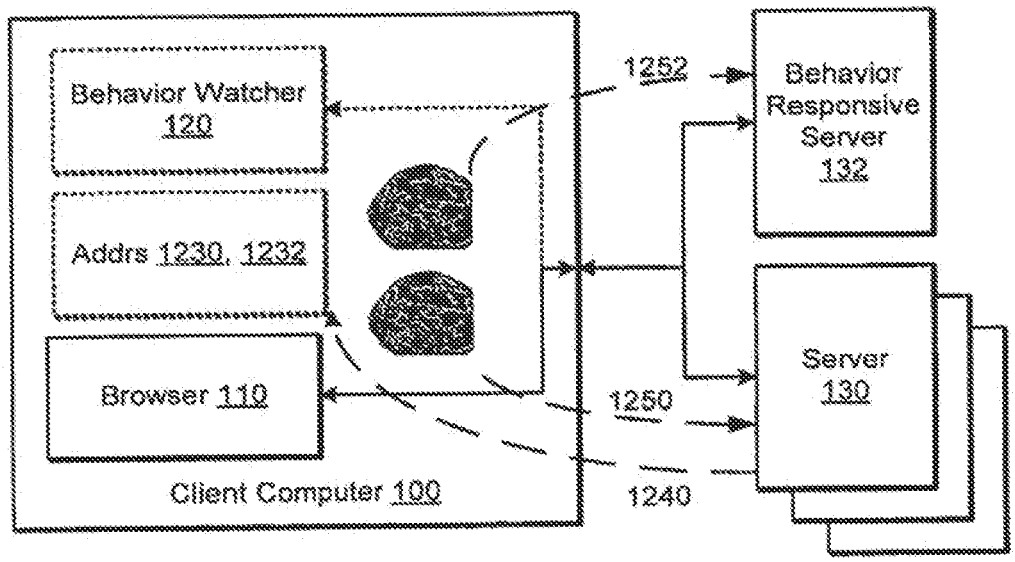
FIG. 12 illustrates interaction among the client computer, a server and a reported-behavior responsive server.

FIG. 12 illustrates interaction among the client computer 100, a server 130 and a reported-behavior responsive server 132. A browser 110 or similar software on the client computer 100 accesses a server 130. Server 130 sends back a web page 1240, which includes embedded references to addresses 1230 and 1232. When the browser 110 accesses web page components identified by the addresses, it may send cookies identified with those addresses 1250, 1252 to a server 130 and a reported-behavior responsive server 132. The server 130 may be different server than one that initially sent the web page 1240. During the exchange of data responsive to the request from the browser 110, the cookie 1252 that is transmitted to the behavior-responsive server 132 conveys data such as depicted in FIG. 8. It also may convey other data, such as the time of the last user interest indications in the category, similar to the information depicted in FIG. 6.

Figure 13:
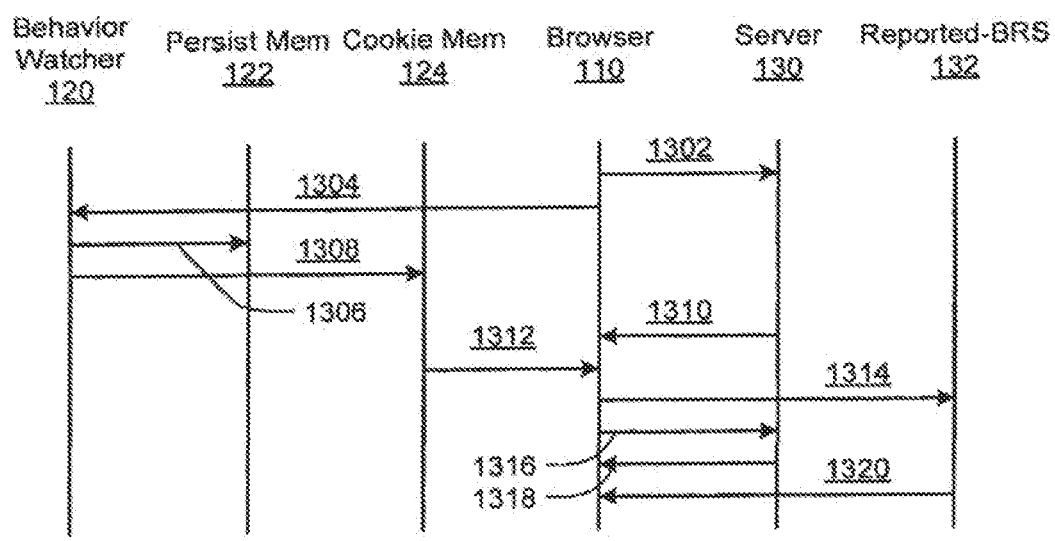
FIG. 13 depicts one embodiment of information flow among the behavior watcher, the browser, one or more servers, one or more reported-behavior responsive servers, persistent memory, and cookie memory.

FIG. 13 depicts one embodiment of information flow among the behavior watcher 120, the browser 110, one or more servers 130, one or more reported-behavior responsive servers 132, persistent memory 122 and cookie memory 124. In this figure, the user indicates their interest in a subject to a browser 110 or similar software. This indication of interest typically results in the browser 110 transmitting a search request, URL or similar message 1302 to a server 130. The behavior watcher 120 receives the indication of interest 1304 from its monitoring of the browser 110. Optionally, it records the indication of interest 1306 to persistent memory 122. Recording to persistent memory may take place immediately, periodically or both. For instance, the most recent keyword, search term, banner click or other indication of interest may be recorded to memory with a date and time stamp. As described above, a periodic history of interests may be updated periodically. The behavior watcher 120 publishes information about user behavior to cookies 124 or similar memory structures that are readily accessible to reported-behavior responsive servers 132 when a browser 110 accesses a server 130 that triggers a message to a reported-behavior responsive server 132 or contacts the server 132 directly. This publishing of behavior may include both publishing information about the most recent indication of user interest and publishing categorical information summarizing recent user interest.

Use of information published by the behavior watcher 120 to accessible memory structures is also illustrated in FIG. 13. Typically, a server 130 returns a web page 1310 to the browser 110. Depending on the addresses embedded in the web page 1310, various cookies 1312 are automatically retrieved by the browser 110. When the web page 1310 includes an address of a reported-behavior responsive server 132, one or more cookies that summarize user behavior and interests observed by the client-side behavior watcher are transmitted 1314 to the server 132. In addition, one or more cookies 1316 may be transmitted to server 130. The reported-behavior responsive server 132 decodes the cookie 1314, determines what message or ad to return to the browser 110 and sends a customized message 1320 that is responsive to the reported behavior 1314 of the user.

Figure 14:
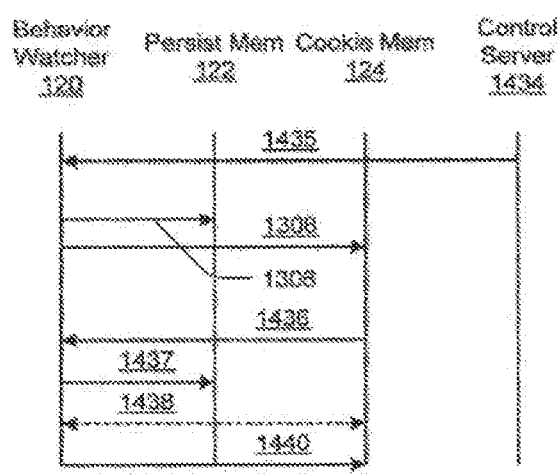
FIG. 14 depicts republication and restoration of cookies.

FIG. 14 depicts republication and restoration of cookies. Republication of cookies that summarize observed user behavior is the simpler case. As described above, the behavior watcher 120 may record observed behavior and interests 1306 to persistent memory 122 and publish similar information 1308 to cookies 124. For republication, the behavior watcher 120 periodically inspects cookie memory 124 to determine whether the cookies have been deleted or damage 1438. Alternatively, the behavior watcher 120 might detect cookie deletion events or possible cookie deletion events and schedule republication following cookie deletion. When it detects that the cookies have been deleted or damaged 1438, it republishes the cookies 1440 to the cookie memory 124. The cookies are again in place as memory structures readily accessible to reported-behavior responsive servers 132.

Backup and restoration of cookies are also illustrated by FIG. 14. A control server 1434 instructs the behavior watcher 120 or a backup and restore component of the behavior watcher regarding cookies to be backed up and restored 1435. The behavior watcher 120 retrieves from cookie memory 124 cookies for which a backup and restore service is to be provided 1436. The behavior watcher 120 records or backs up 1437 the cookie information to persistent memory 122. The behavior watcher 120 need not be aware of the content of the cookies in order to provide this backup service. The cookies need not include observed behavior data and may be directed to ordinary servers 130. The behavior watcher 120 periodically inspects cookie memory to determine whether the cookies have been deleted or damage 1438. Alternatively, the behavior watcher can detect cookie deletion events and schedule restoration of cookies following cookie deletion. When it detects that the cookies have been deleted or damaged 1438, it restores the cookies 1440 to the cookie memory 124. The cookies are again in place as memory structures readily accessible to servers 130.

Some Particular Embodiments

The present invention may be practiced as a method or device adapted to practice the method. The same method can be viewed from the perspective of a behavior summarizing module optionally including a behavior observing module and a summary publishing module. The invention may be an article of manufacture such as media impressed with logic to carry out computer-assisted behavior summarizing optionally including behavior observing module and a summary publishing module.

One embodiment is a method of publishing behavioral data from a client computer via network to an authorized domain. This method includes summarizing observed cross-network user behavior data using a behavior summarizing module operating on a user's computer, wherein the observed cross-network user behavior includes accessing web sites that are not all associated with a particular user behavior data collection network. Alternatively, cross-network may refer to web sites or other content delivery vehicles that are not all associated with a particular portal or a particular virtual storefront or a particular content provider. The behavior further includes at least one of a mouse click-through, enter keystroke or other selection action by the user and at least one keyword derived from context of the selection action. The summarizing includes deriving a categorical metric of the user's degree of interest in subject categories, from the observed cross-network user behavior data, for a multiplicity of subject categories. The method includes publishing the summarized cross-network user behavior data from the behavior summarizing module to a memory structure, wherein the memory structure becomes accessible via a network to a server at an authorized domain when the user uses the network to access the authorized domain. This method may be extended in several ways.

A further aspect of this method includes prioritizing a multiplicity of subject categories, selecting a plurality of the multiplicity of subject categories, and publishing the summarized cross-network behavior data for the plurality of subject categories to a single memory structure. This memory structure, optionally, may be a so-called cookie. Another aspect of this method may include observing the cross-network user behavior data using a behavior watching module operating on the user's computer. The behavior watching module may be integrated with the behavior summarizing module. Alternatively, the two behavior-related modules may be separate modules, even using separate hardware.

The cross-network behavioral data may include user selection of one or more of the following: submission of a search term to a search engine, either using a browser interface or a search engine-specific interface, visiting a portal, visiting a virtual storefront, visiting a content provider, entering a URL in a browser address window, selecting a URL hyperlink, or clicking on a banner ad associated with a link. More generally, the user selection may be any navigation among documents that are linked semantically or by addresses. The meaning given to "cross-network" above also applies here.

Publishing to the memory structure may take place on a periodic basis and/or on an update basis. By an update basis, it is meant that the memory structure update follows detection of the user selection.

Yet another aspect of this method may include receiving at the user's computer advertising targeted using the summarized cross-network user behavior data published to the memory structure that became accessible when the user used the network to access the authorized domain.

The categorizing may include rolling up indicators of visits into non-overlapping categorical time segments of differing lengths. This may be accomplished by representing a plurality of granular time segments with flags to indicate user category involvement and summarizing a portion of the granular time segments by aggregation to the categorical time segments.

Another embodiment is a method of publishing behavioral data collected by a behavior watching module operating on the user's computer, including summarizing cross-network user behavior data recorded to memory. The summarizing includes, for a multiplicity of subject categories, deriving one, two, three or four of the following items: (1) categorizing recency of visiting a web site in the subject category by evaluating a most recent visit time-date indicator; (2) categorizing frequency of user visits to web sites in the subject category by rolling up indicators of visits during seven, ten or more time segments or any number of categorical time segments, which time segments were recorded on a rolling basis; (3) categorizing recency of selection of a banner ad to obtain additional information in the subject category by evaluating a most recent visit time-date indicator; or (4) categorizing frequency of user selections of the banner ad to obtain additional information in the subject category by rolling up indicators of visits during seven, ten or more time segments or any number of categorical time segments, which time segments are tracked on a rolling basis. The method further includes publishing the summarized cross-network behavior data from a behavior summarizing module to memory structure that becomes accessible via a network to a server at an authorized domain when the user uses the network to access the authorized domain.

Any and all aspects of the first embodiment may be applied to the second embodiment.

While the present invention is disclosed by reference to the preferred embodiments and examples detailed above, it is understood that these examples are intended in an illustrative rather than in a limiting sense. Computer-assisted processing is implicated in the described embodiments. It is contemplated that modifications and combinations will readily occur to those skilled in the art, which modifications and combinations will be within the spirit of the invention and the scope of the following claims.

We claim:

1. A computer-implemented method, implemented, at least in part, by a server computer, the method comprising:
   receiving, by the server computer, one or more memory structures that include published summarized cross-network user behavior data from a client computer, wherein the published summarized cross-network user behavior data includes:
   collected cross-network user behavior data on the client computer,
   the collected cross-network user behavior data being summarized on the client computer, and
   the summarized collected cross-network user behavior data published to the one or more memory structures on the client computer;
   determining, by the server computer, content to send to a browser of the client computer based on the one or more memory structures; and sending, by the server computer, the content to the browser of the client computer.

2. The method of claim 1, wherein in response to a user accessing an authorized domain via the client computer via a network, the client computer provides at least some of the summarized cross-network user behavior data in the one or more memory structures on the client computer to a server at the authorized domain.

3. The method of claim 1, wherein the cross-network user behavior data includes data related to a user's interactions with a plurality of web sites and not all of the plurality of web sites are associated with a content provider, and not all of the plurality of web sites are associated with a portal.

4. The method of claim 3, wherein the collected cross-network user behavior data is summarized on the client computer by, for a plurality of subject categories, one or more of:
   categorizing recency of the user visiting a web site on the client computer in at least some of the plurality of subject categories,
   categorizing user category involvement from the user visiting the website on the client computer in at least some of the subject categories by rolling up indicators of visits into categorical time segments,
   categorizing recency of selections of at least one banner advertisement on the client computer, or
   categorizing user category involvement from user selections of the at least one banner advertisement on the client computer.

5. The method of claim 4, wherein the categorizing the user category involvement includes rolling up the indicators of visits into nonoverlapping categorical time segments of differing lengths.

6. The method of claim 4, wherein the categorizing user category involvement includes representing granular time segments with flags to indicate user category involvement during the granular time segment and summarizing a portion of the granular time segments by aggregation into categorical time segments.

7. The method of claim 1, further comprising:
   prioritizing a plurality of subject categories, and
   selecting at least one subject category of the plurality of subject categories.

8. The method of claim 1, wherein the cross-network user behavioral data includes data relating to visits to a plurality of web sites or selections of banner advertisements that are not all associated with a behavioral data collection network.

9. The method of claim 1, wherein the cross-network user behavioral data is further related to selections of banner advertisements that are not all associated with a portal.

10. The method of claim 1, wherein the cross-network user behavioral data includes data relating to visits to a plurality of web sites or selections of banner advertisements that are not all associated with a virtual storefront.

11. The method of claim 1, wherein the cross-network user behavioral data is further related to selections of banner advertisements that are not all associated with a content provider.

12. The method of claim 11, wherein the cross-network user behavioral data includes data relating to behavioral data corresponding to a plurality of visits to a plurality of web sites or selections of banner advertisements that are not all associated with a behavioral data collection network.

13. The method of claim 1, wherein the summarized collected cross-network user behavior data is published to the one or more memory structures on the client computer on a periodic basis.

14. The method of claim 1, wherein the summarized collected cross-network user behavior data is published to the one or more memory structures on the client computer in response to one or more web site visit or one or more banner advertisement selection.

15. The method of claim 1, further comprising receiving at the client computer advertising targeted using the summarized collected cross-network user behavior data published to the one or more memory structures on the client computer.

16. A server computer configured to:
   receive one or more memory structures that include published summarized cross-network user behavior data from a client computer, wherein the published summarized cross-network user behavior data includes:
      collected cross-network user behavior data on the client computer,
      the collected cross-network user behavior data being summarized on the client computer, and
      the summarized collected cross-network user behavior data published to the one or more memory structures on the client computer;
   determine content to send to a browser of the client computer based on the one or more memory structures; and
   send the content to the browser of the client computer.

17. A non-transitory computer-readable medium storing executable instructions that, in response to execution, cause a server to perform operations comprising:
   receiving, by the server, one or more memory structures that include published summarized cross-network user behavior data from a client computer, wherein the published summarized cross-network user behavior data includes:
      collected cross-network user behavior data on the client computer,
      the collected cross-network user behavior data being summarized on the client computer, and
      the summarized collected cross-network user behavior data published to the one or more memory structures on the client computer;
   determining, by the server, content to send to a browser of the client computer based on the one or more memory structures; and
   sending, by the server, the content to the browser of the client computer.

* * * * *